June 13, 1961   F. H. SIEBENTRITT ET AL   2,988,573
PROCESS FOR PRODUCING PHENOL
Filed Oct. 6, 1958
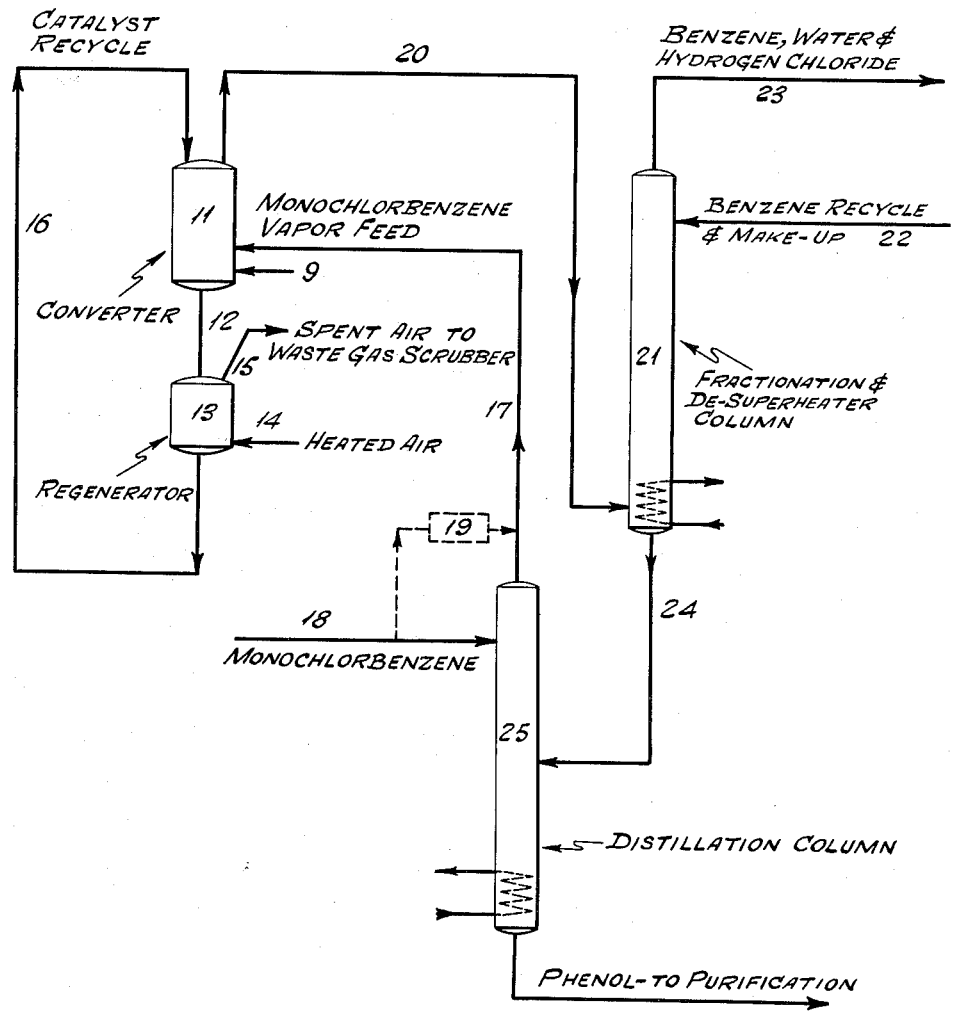
INVENTORS
FRANK H. SIEBENTRITT
PAUL E. GAMBLE
WARREN B. IMBRIANI
BY
ATTORNEY

United States Patent Office 2,988,573
Patented June 13, 1961

2,988,573
PROCESS FOR PRODUCING PHENOL
Frank H. Siebentritt, Piscataway Township, and Paul E. Gamble, Bound Brook, N.J., and Warren B. Imbriani, Charleston, W. Va., assignors to Union Carbide Corporation, a corporation of New York
Filed Oct. 6, 1958, Ser. No. 765,481
7 Claims. (Cl. 260—629)

This invention relates to a process for preparing a ring hydroxyl substituted carbocyclic compound from the corresponding halogenated aromatic hydrocarbon. More particularly, it relates to an improved process for preparing phenol by the hydrolysis of monochlorobenzene. Even more particularly, it relates to an improved method for the separation of phenol from a system comprising in addition to phenol, monochlorobenzene, hydrogen chloride, and water.

It is generally known in the art that phenol can be produced from benzene by the general method of reacting benzene, a hydrogen halide preferably hydrogen chloride, and air in the presence of a suitable catalyst to form, for instance, monochlorobenzene and then hydrolyzing the monochlorobenzene to produce phenol and hydrogen chloride. The process has the advantage that hydrogen chloride, which in the first stage of operation produces monochlorobenzene from benzene, is regenerated in the second stage in which monochlorobenzene is reacted with water to form phenol and hydrogen chloride. In actual commercial production, however, economical operation is more difficult than the apparent simplicity that the reaction steps imply. Particularly in a continuous recycle type of process, the unit operations of extraction, distillation, evaporation, and the like, and the equipment required to carry out these operations, account for a substantial portion of the cost of the final product. For this reason it is vital that the unit operation be so integrated and scheduled that the heat, power, equipment, and time requirements are at an absolute minimum.

Several specific methods of operation have heretofore been proposed to improve the efficiency of the fundamental process. For the most part these improvements have been concerned with changes in the catalyst composition, changes in the manner of catalyst utilization and regeneration, and modifications in particular pieces of equipment such as refluxing towers, reactors, etc. The basic steps comprising the second stage of the process and the order in which these steps are carried out has remained substantially unchanged.

In the second stage of the aforesaid general process the reactants comprising monochlorobenzene from the first stage and water are conventionally introduced into a catalytic converter in the vapor phase. The mixture found most advantageous to use under the circumstances was one which contained approximately 30 percent by weight of water vapor and 70 percent by weight of chlorobenzene since a liquid mixture having this composition is a constant boiling mixture. A number of suitable catalysts have heretofore been proposed such as $SiO_2$, and those inorganic salts having as the positive radical a metal of the group magnesium, aluminum, calcium, copper, zinc, and scandium, and having as the negative radical an element such as silicon, phosphorous, sulfur, or chlorine. Only a portion of the monochlorobenzene entering the converter is hydrolyzed to phenol. The mixture discharged from the converter therefore comprises phenol, hydrogen chloride, monochlorobenzene, water, and a small amount of mixed by-product.

According to one method of treating the reaction products, the hot vaporized products are passed through or in contact with an alkaline earth oxide, hydroxide, or carbonate which immediately reacts with the hydrogen chloride to form the corresponding alkaline earth chloride while the phenol and chlorobenzene pass through unchanged.

By another method, the reaction products are separated in a fractionation column, to which makeup monochlorobenzene and water are refluxed in such proportions that an overhead stream having a 70:30 weight ratio of monochlorobenzene to water is obtained. The residue from the column consists of phenol, monochlorobenzene, hydrogen chloride, and water which separates into two layers—one layer consisting primarily of phenol and monochlorobenzene which is removed from the system for separation and purification, and the other layer consisting very largely of water, hydrogen chloride, and some dissolved phenol. The phenol in this latter mixture is extracted with benzene and the dilute hydrochloric acid solution is evaporated before being recycled to the first stage of the overall process where it is reacted with benzene and air to form more monochlorobenzene.

It can readily be seen that certain disadvantages are inherent in the prior art procedures. For instance, in the method in which phenol is separated from the hydrochloric acid by reacting the hydrogen chloride with a base to form a salt, the recycle of hydrogen chloride is seriously impaired, if not completely prohibited. In the method in which the hydrogen chloride is not destroyed, the removal of dissolved phenol in the aqueous hydrochloric acid solution requires the use of large capacity extraction equipment and the carrying out of an evaporation operation to concentrate the remaining dilute hydrochloric acid for recycling to the first stage of the general process. These operations are both expensive and time consuming, and not only bring about lower production but add to the cost of the phenol produced.

It is therefore the general object of the present invention to provide an improved process for producing aromatic hydroxy compounds which avoids the disadvantages of the prior art.

It is a more particular object to provide an improved process for producing phenol from monochlorobenzene which eliminates the necessity of separating phenol from a dilute hydrochloric acid solution.

It is still another object of the invention to provide an improved process for producing phenol from monochlorobenzene in which hydrochloric acid formed as a by-product is immediately available, without recourse to concentration, for reuse as a reactant.

A further object of the present invention is to provide an improved process for producing phenol on a continuous basis which eliminates the need for certain chemical apparatus required in prior art processes.

These and other objects will be apparent from the specification, the examples therein, the appended claims, and the drawing.

According to the present invention, the objects hereinbefore stated are accomplished in a process for the conversion of monochlorobenzene to phenol, which process includes the steps of reacting in the presence of a suitable hydrolysis promoting catalyst a mixture of monochlorobenze in the vapor state and water in the form of steam to produce a mixture comprising unreacted monochlorobenzene, the corresponding hydroxy compound thereof, hydrogen chloride, and water, adding benzene to said mixture in an amount sufficient to form an azeotrope containing benzene and substantially all of the water present in said mixture, separating the monochlorobenzene and the corresponding hydroxy compound from the azeotrope by fractionation, separating the monochlorobenzene from the corresponding hydroxy compound by distillation.

The single attached drawing, identified as FIG. 1 is a schematic representation of one method of operating in accordance with the teachings of the present invention.

The catalytic converter 11 may comprise any suitable closed vessel having provisions for introduction of reactants and separate withdrawal of catalyst particles and reaction effluent. The converter 11 is connected to a catalyst regenerator 13 through conduit 12, through which catalyst particles from the converter are constantly fed by means of gravity flow, mechanical conveyor, or other suitable means. In regenerator 13, tars and other impurities on the catalyst are removed by treating the catalyst with a regenerating gas such as heated air or oxygen. The regenerating gas is fed to the regenerator 13 through line 14 and is discharged through line 15 to a scrubber (not shown) where it is preferably purified before discharge to the atmosphere. Recycle of the regenerated catalyst to the converter is accomplished through line 16 by means of an inert gas lift, or other convenient mechanical conveying means. As a rule, the catalyst particles may range in size from about ⅛ inch to about ⅜ inch in diameter, although catalyst size is not critical to the practice of this invention. Preferred, however, is the range of from ¼ inch to ⅜ inch, particles of about ⅜ inch being particularly preferred. The hydrolysis promoting catalyst composition may comprise, among others, the magnesium, aluminum, calcium, copper, zinc, or scandium compounds of silicon, phosphorous, sulphur, or chlorine. The particular catalyst employed is by no means critical and may be selected from any well known in the art.

Chlorobenzene vapor at an elevated temperature is introduced into converter 11 through line 17 which is in turn supplied in part by monochlorobenzene through line 18. Since the process as shown is cyclic, the chlorobenzene can be supplied by two different sources, namely the recycled chlorobenzene which was not hydrolyzed during a previous pass through the converter 11, and chlorobenzene from a separate external source which may be advantageously a continuous process in which monochlorobenzene is produced by the catalyzed reaction of benzene, air, and hydrogen chloride. Since the monochlorobenzene is fed to the converter as a heated vapor, the monochlorobenzene from the external source may be passed through a preheater 19 or fed into the process cycle at a point in distillation column 25 where it is preheated in the same operation in which the recycled monochlorobenzene is separated from the phenol produced in a previous pass through the converter 11. However, whether the monochlorobenzene from both sources are combined and preheated or preheated separately, the temperature at which it enters the converter 11 is advantageously in the range of from about 375° C. to about 475° C., i.e. the internal operating temperature of the converter. Preferably the internal temperature of the converter 11 and the temperature of the feed-in stream of chlorobenzene is in the range of about 430° C. to about 450° C. Introduction of chlorobenzene through line 17 should be such as to provide adequate contact of the chlorobenzene vapors with the catalyst particles to promote efficient hydrolysis, and preferably is added at a point about ⅓ of the height of the converter 11 from the bottom if the converter is filled with catalyst, or alternatively at a point about ⅓ of the height of the catalyst in the bed.

Superheated water vapor, i.e. steam, at approximately the same temperature as the monochlorobenzene, i.e. from about 375° C. to 475° C. and preferably about 430° C. to 450° C. is fed through line 9 into the converter 11 at a point below, and preferably near the bottom of the converter 11. Introduction of the steam in this manner enables the steam to purge the downward flowing catalyst particles of adsorbed hydrogen chloride, monochlorobenzene, and residual phenol formed earlier in the cycle, as well as providing one of the reactants in the converter 11. The quantity of water so introduced is not narrowly critical, whereas equal molar ratios of water and monochlorobenzene in the converter have been found to be quite suitable, molar ratios of monochlorobenzene to water of greater than 1.0 have the advantage of limiting the amount of water which must ultimately be removed in a later stage in the process. For this reason it is preferred to charge the converter 11 with a reactant ratio of only about 0.67 mole of water per mole of monochlorobenzene. Hydrolysis of the chlorobenzene occurs in the converter 11 which gives rise to a mixture of phenol, chlorobenzene, water, and hydrochloric acid. This mixture is passed by line 20 to a point at or near the base of fractionation and de-superheater column 21. Since the mixture leaving the converter is at a temperature considerably higher than the temperature required for the fractionation operation carried out in column 21, cooling of the mixture, either by normal heat loss as it flows from the converter to the fractionation column, or by more positive means such as passing the mixture through a heat exchanger is required prior to fractionation. Advantageously the excess thermal energy of the mixture is utilized in the fractionation column 21 to balance the heat loss normally incurred in a fractionation operation.

Benzene in a quantity sufficient to form an azeotrope with substantially all the water present in the reaction mixture is fed in at a point at or near the top of the same fractionating column 21 through line 22. The formation of the azeotrope effectively removes the water from the mixture fed to column 21. The operating temperature of column 21 is dependent upon the internal pressure of the system, but should be such as to accomplish a substantially complete separation of all the azeotrope containing benzene and water, excess benzene if an excess is present, and hydrogen chloride from the monochlorobenzene-phenol bottoms. At atmospheric pressure, for instance, it is preferred that the bottom of the fractionating column be operated at a temperature between about 140° C. and 160° C. thereby assuring a substantially complete separation of monochlorobenzene and phenol from the other components present. The benzene, water, and hydrogen chloride vapors are removed from the top of column 21 and are passed, if desired, to a reaction system (not shown) through line 23 to be used as reactants to form additional monochlorobenzene. The residue of column 21 consists principally of phenol and unreacted monochlorobenzene and under optimum conditions will contain no water, benzene, or hydrogen chloride. This residue is passed by line 24 to a distillation column 25 where phenol is removed as a residue for ultimate purification and monochlorobenzene is distilled over for recycle to the converter 11 through line 17 in conjunction with a supplemental charge of chlorobenzene from an external source. Purification column 25 is operated at a temperature and pressure sufficient to give substantially complete rectification of the chlorobenzene from the phenol residue.

Whereas the foregoing description has been set forth with reference to a particular embodiment, it is intended that the scope of the invention be not limited thereby, but rather to include a number of modifications obvious to those skilled in the art.

Sufficient benzene is added to the mixture to form a ternary composition of benzene, water, and hydrogen chloride. At standard pressure conditions, i.e. one atmosphere, a benzene-hydrogen chloride-water azeotrope consists of 93.13 percent benzene, 1.54 percent hydrogen chloride, and 5.33 percent water on a weight basis and boils at 73° C. Because hydrogen chloride is removed from the mixture in the fractionating column under equilibrium conditions with respect to water and benzene, the rate of hydrogen chloride removal is predictable and easily controlled. Further, the total removal of the hydrogen chloride is made possible by controlling the benzene and water content of the fractionation column.

In another instance, although the greatest efficiency of the improved process is obtained when used in conjunction with a moving catalyst bed, the method is completely adaptable to fixed catalyst bed conditions. Similarly it is not essential that any products or unreacted reactants be recycled if a single pass of the reactants is sufficient for a given purpose.

Although a preferred molar ratio of water to chlorobenzene in the charge to the converter has been specified as 1:1, and a more particularly preferred molar ratio of 1 mole chlorobenzene to 0.67 mole of water has also been stated, it is clear that the ratio may be modified in favor of a greater percentage of water without departing from the body of the invention. A greater amount of water in the converter will simply require a greater amount of benzene to be utilized in forming the azeotrope in the later separation operation. However, since the hydrolysis reaction

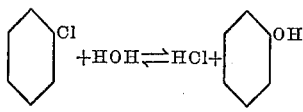

occurring in the converter is reversible, a larger percentage of water than the stoichiometrical amount may be used to favor the formation of phenol. Also, the vapors may pass over the catalyst at a higher speed as the proportion of water vapor is increased and therefore there is less tendency for any by-products to settle out and foul the catalyst.

The following example is illustrative of typical operation of the process of the present invention.

*Example I*

In an arrangement similar to that shown in the drawing, 96,000 pounds of a pelletized mixture of copper phosphate and calcium phosphate having an average pellet size of ¼ inch are charged to the converter which is maintained at a temperature of about 400° C. Monochlorobenzene vapor preheated to about 400° C. is charged to the converter under a pressure of 5 to 10 p.s.i.g. and at a rate of 181,700 pounds per hour. Point of entrance of the monochlorobenzene into the converter is approximately ⅓ of the distance from the bottom of the catalyst bed. Simultaneous with the charging of the chlorobenzene, steam at about 430° C. is charged to the converter at the bottom of the catalyst bed at a rate of about 19,400 pounds per hour. The catalyst pellets are continuously fed by gravity to a regenerator in which a temperature of about 475° C. is maintained, regeneration being brought about by contact of the pellets with a stream of air preheated to 475° C. and recycled to the top of the converter. The reaction product mixture consisting of unreacted monochlorobenzene, phenol, steam and hydrogen chloride vapor which passes out of the converter is heat exchanged with incoming reactants and is passed at a temperature of about 230° C. to the bottom of a fractionation column having about 16 theoretical plates. At the top of the column, benzene is introduced at a rate of about 180,000 pounds per hour resulting in the formation of a constant boiling mixture having a composition of 93.13 percent benzene, 5.33 percent water and 1.54 percent HCl by weight, said mixture being taken off at the top of the column. The bottom in the column comprising phenol and unreacted monochlorobenzene are passed to a distillation unit and separated, the monochlorobenzene which is taken off the top being recycled to the converter, and the phenol collected from the bottom of the distillation column and refined in the conventional manner. Average percent conversion per pass of monochlorobenzene to phenol is about 17 percent.

From a reading of the preceding description of our invention, it can readily be seen that we have provided a simple, efficient and economical process for obtaining phenol by the hydrolysis of chlorobenzene. Not only has the process of this invention made possible the elimination of certain expensive equipment, but has also avoided the chemical destruction of the HCl which is economically used in the manufacture of monochlorobenzene from benzene.

What is claimed is:

1. A process for preparing phenol which includes the steps of reacting in the vapor state in the presence of a hydrolysis promoting catalyst monochlorobenzene with steam to produce a mixture comprising phenol, hydrogen chloride, water, and said monohalogenated benzene, adding benzene to said mixture in an amount sufficient to form an azeotrope consisting of benzene, hydrogen chloride, and substantially all of the water present, removing said azeotrope from said phenol and said monohalogenated benzene by fractionation, and separating said phenol from said monochlorobenzene by distillation.

2. A process for preparing phenol which includes the steps of reacting in a reaction zone maintained at a temperature of from about 375° C. to about 475° C. and in the presence of a particulate hydrolysis catalyst, a mixture of steam and monochlorobenzene in the vapor state, said mixture having a molar concentration ratio of steam to monochlorobenzene of about 1:1, removing from the reaction zone the reaction mass comprising phenol, hydrogen chloride, monochlorobenzene, and water, adding benzene to said reaction mass in an amount sufficient to form an azeotrope consisting of hydrogen chloride, benzene and substantially all of the water present, removing said azeotrope from said phenol and monochlorobenzene by fractionation, separating said phenol from said monochlorobenzene by distillation, and recycling said monochlorobenzene to the reaction zone.

3. A process for preparing phenol as described in claim 2 in which the mixture of steam and monochlorobenzene in the reaction zone has a molar concentration ratio of steam to monochlorobenzene of about 0.67:1.

4. A process for preparing phenol as described in claim 3 in which the reaction zone is maintained at a temperature of from about 430° C. to about 450° C.

5. A process for preparing phenol as described in claim 4 in which the reactor is provided with means for continuously removing a portion of the particulate catalyst mixture therefrom, subjecting the removed particles at a temperature of about 475° C. to about 500° C. to a stream of a regenerating gas selected from the group consisting of air and oxygen whereby the catalyst particles are cleaned and reactivated, and means for continuously returning said reactivated particles to the reactor.

6. A process for preparing phenol as described in claim 5 in which the rate of feed of steam and monochlorobenzene to the reactor is such that the molar concentration ratio of steam to monochlorobenzene entering the reactor is in the range of from about 1:1 to about 0.67:1.

7. A continuous process for preparing phenol from monochlorobenzene and water which includes the steps of continuously feeding a stream of monochlorobenzene vapor and a stream of steam to a reactor maintained at a pressure of about 5–10 p.s.i.g. and at a temperature of from about 400° C. to about 450° C. and containing a particulate catalyst mixture of calcium phosphate and copper phosphate having particle size of from ⅛ to ⅜ inches, continuously removing from said reaction a reaction mass comprising phenol, hydrogen chloride, and unreacted monochlorobenzene and water, feeding said reaction mass to a fractionation column and simultaneously adding to said fractionation column an amount of benzene sufficient to form an azeotrope of benzene with substantially all of the water present, said azeotrope consisting of benzene, hydrogen chloride, and water, separating the phenol and monochlorobenzene from said azeotrope by fractional distillation, feeding the phenol and monochlorobenzene to a distilling column, and separating said phenol from said monochlorobenzene, and recycling the monochlorobenzene to the reactor.

References Cited in the file of this patent

UNITED STATES PATENTS

| | | |
|---|---|---|
| 1,964,768 | Prahl et al. | July 3, 1934 |
| 2,051,782 | Buchheim et al. | Aug. 18, 1936 |
| 2,311,777 | Redman | Feb. 23, 1943 |
| 2,322,881 | Pollock | June 29, 1943 |

FOREIGN PATENTS

| | | |
|---|---|---|
| 654,153 | Great Britain | June 6, 1951 |